(12) United States Patent
Noca et al.

(10) Patent No.: US 12,503,844 B2
(45) Date of Patent: Dec. 23, 2025

(54) BUILDING BLOCK FOR CONSTRUCTING A BUILDING AND METHOD FOR CONSTRUCTING A BUILDING

(71) Applicants: Laurent Noca, Hauterives (FR); François Cochet, Barraux (FR)

(72) Inventors: Laurent Noca, Hauterives (FR); François Cochet, Barraux (FR)

( * ) Notice: Subject to any disclaimer, the term of this patent is extended or adjusted under 35 U.S.C. 154(b) by 270 days.

(21) Appl. No.: 18/288,016

(22) PCT Filed: Apr. 25, 2022

(86) PCT No.: PCT/EP2022/060936
§ 371 (c)(1),
(2) Date: Oct. 23, 2023

(87) PCT Pub. No.: WO2022/223845
PCT Pub. Date: Oct. 27, 2022

(65) Prior Publication Data
US 2024/0209618 A1 Jun. 27, 2024

(30) Foreign Application Priority Data
Apr. 23, 2021 (FR) ...................................... 2104267

(51) Int. Cl.
*E04B 1/14* (2006.01)
*E04B 1/38* (2006.01)

(52) U.S. Cl.
CPC ................ *E04B 1/14* (2013.01); *E04B 1/383* (2013.01)

(58) Field of Classification Search
CPC . E04B 1/14; E04B 1/383; E04B 1/161; E04B 1/34853; E04B 1/34823
See application file for complete search history.

(56) References Cited

U.S. PATENT DOCUMENTS 1,602,985 A * 10/1926 Mcwilliams .............. E04B 5/21
52/577
8,733,048 B1 * 5/2014 Hanson ..................... E04B 1/16
52/348
(Continued)

FOREIGN PATENT DOCUMENTS

DE 4115643 A1 * 11/1992 ......... E04B 1/34823
EP 1 045 078 A2 10/2000
(Continued)

OTHER PUBLICATIONS

Jun. 20, 2022 International Search Report issued in International Patent Application No. PCT/EP2022/060936.
(Continued)

*Primary Examiner* — Patrick J Maestri
(74) *Attorney, Agent, or Firm* — Oliff PLC

(57) ABSTRACT

A building block for construction of a building includes a floor and walls. One of the walls includes a recess box. The walls are fixed to the floor and to one another. The floor includes a support made from wood-concrete and defines grooves. A metal armature formed by a plurality of metal rods is arranged in the grooves. At least first metal rods are salient from the ends of the first grooves. A concrete fills the grooves and completely covers the metal armature and the support. The walls are made from wood-concrete and define a vertical groove on their external surface extending over the height of the walls and opening onto the first metal rods salient from the support.

9 Claims, 6 Drawing Sheets

(56) References Cited

U.S. PATENT DOCUMENTS

| | | |
|---|---|---|
| 11,434,637 B2 | 9/2022 | Cochet et al. |
| 2019/0063099 A1* | 2/2019 | Jenks .................... E04B 1/165 |
| 2021/0262229 A1 | 8/2021 | Cochet et al. |

FOREIGN PATENT DOCUMENTS

| | | | |
|---|---|---|---|
| IT | 20070273 A1 * | 10/2008 | |
| WO | 2009/112037 A1 | 9/2009 | |
| WO | 2020/016531 A1 | 1/2020 | |

OTHER PUBLICATIONS

Jun. 20, 2022 Written Opinion of the International Searching Authority issued in International Patent Application No. PCT/EP2022/060936.

* cited by examiner

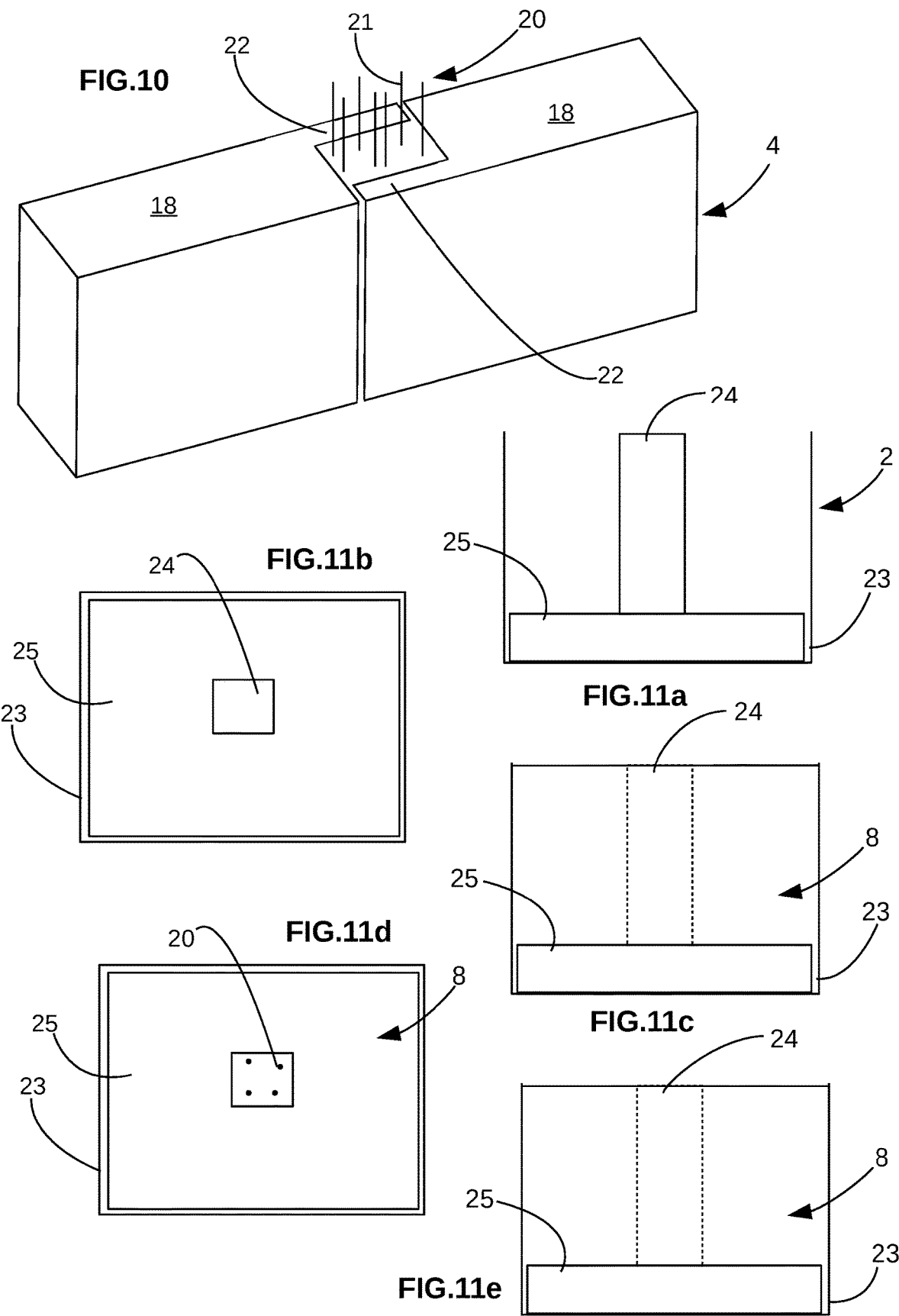

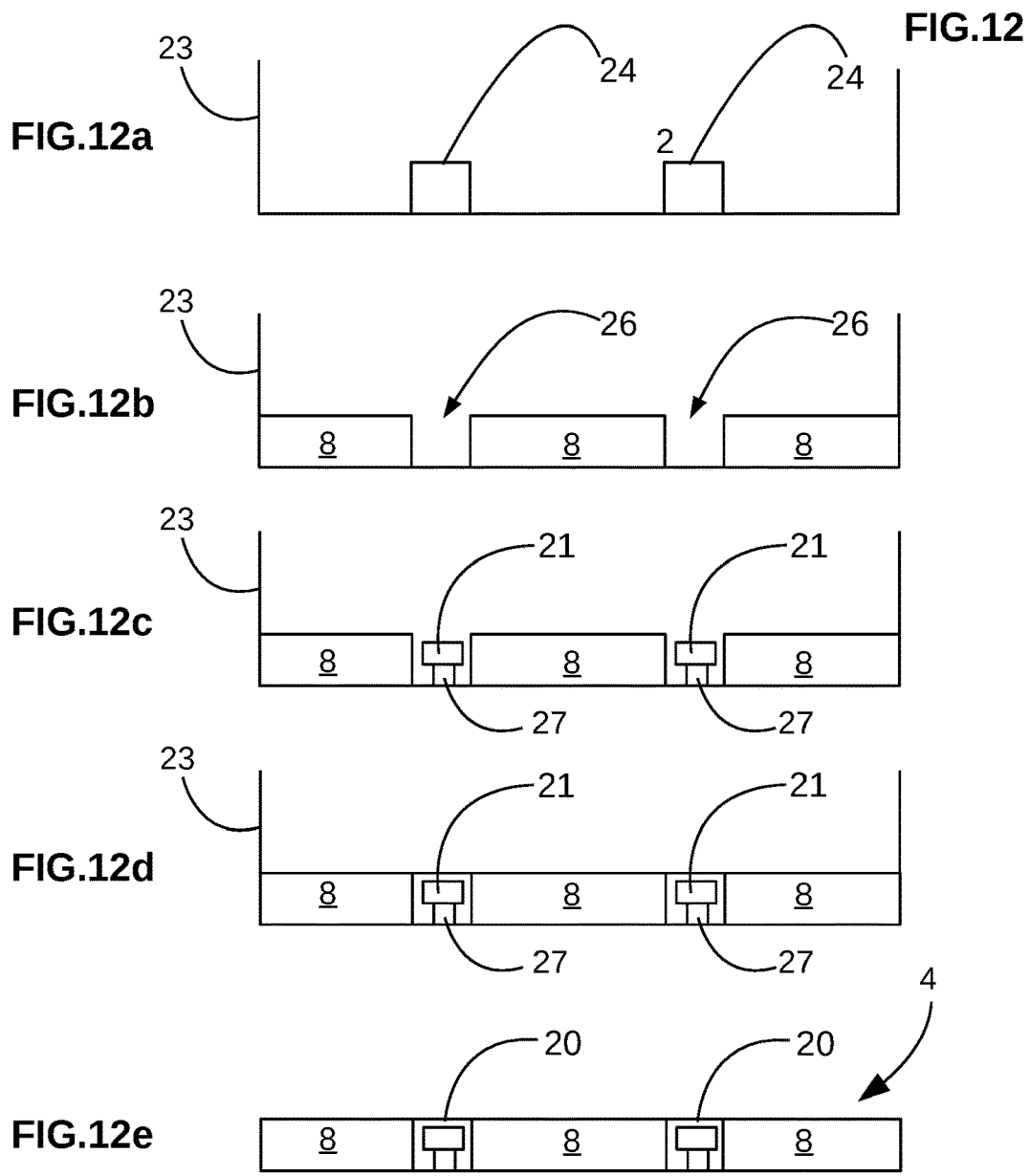
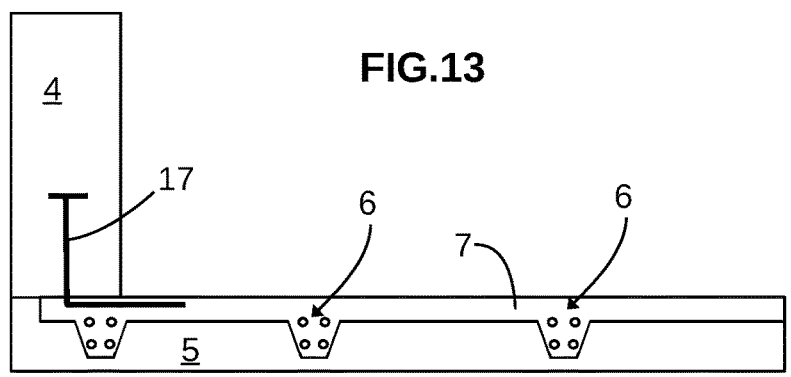

BUILDING BLOCK FOR CONSTRUCTING A BUILDING AND METHOD FOR CONSTRUCTING A BUILDING

BACKGROUND OF THE INVENTION

The invention relates to a building block for constructing a building and to a method for constructing a building.

STATE OF THE ART

Different construction methods exist for constructing a building, in particular assembly of modular building blocks that are adjoined and then secured to one another to form the structure of the building. It is known to manufacture building blocks from different materials. The pre-assembled building blocks enable the structure to be constructed under better-controlled conditions. The blocks are manufactured before assembly thereby enabling a building to be constructed more quickly as the drying times are eliminated.

In the design stage of the building blocks, it is important to take account of the dimensions of the building to be constructed and especially the number of storeys to be supported and the seismic zoning. The larger the number of storeys and/or the seismic zoning value, the greater the mechanical strength of the building blocks has to be, naturally resulting in a heavier building block being manufactured. This then increases the difficulty of transportation and erection of the building block. Consequently, it is particularly difficult to construct multi-storey buildings from ready-made building blocks.

Prefabricated panels made from wood or metal can be manufactured, but they do not present the properties of concrete. In particular, building blocks made from wood or metal have a limited fire resistance. It is also apparent that these building blocks present a perfectible thermal comfort and a lesser mechanical stability than that of concrete. Concrete building blocks are heavy which makes transportation complicated.

The document WO 2009/112037 discloses a prefabricated self-supporting construction element intended for forming multi-storey buildings. The side walls are formed by a reinforced concrete frame filled with a light concrete. The external surface of the side walls is covered by an insulating material that defines grooves. Metal rods are fixed to the insulating material layer and are sunk in the light concrete inside the frame to reinforce the light concrete of the side walls. Two construction elements are arranged side by side and a casting step is performed to form columns and support beams. Before the casting step is performed, a U-shaped connection element is fixed to two adjacent construction elements. It is apparent that such a building block remains relatively heavy on account of its reinforced concrete frames.

SUMMARY OF THE INVENTION

One object of the invention consists in overcoming these shortcomings, and more particularly in providing a building block having a lower weight in comparison with an equivalent structure made from reinforced concrete or that of the prior art while at the same time presenting a mechanical strength and an erection compatible with construction of a multi-storey building.

These shortcomings tend to be overcome by means of a building block for construction of a building comprising:
a floor;
a plurality of walls, at least one wall of the plurality of walls comprising a recess box, the walls of the plurality of walls being fixed to the floor and fixed to one another;
wherein the floor comprises a support made from a first mixture comprising a mineral binder and vegetal material particles, the particles being sunk in the mineral binder, the support defining a plurality of first grooves and second grooves, the first grooves having a first longitudinal direction secant to a second longitudinal direction of the second grooves, the volume fraction of vegetal material particles in the first mixture being greater than 50%;
wherein the floor comprises a metal armature comprising a plurality of first metal rods arranged in the first grooves and of second metal rods arranged in the second grooves, the metal armature having connectors fitted salient from the support at the two ends of the first grooves for hoisting the building block;
wherein the floor comprises a second mixture filling the first grooves and the second grooves and completely covering the metal armature and the support forming reinforced beams, the second mixture having a volume fraction of vegetal material particles of less than 20%;
wherein the walls of the plurality of walls are made from a third mixture that comprises a mineral binder and vegetal material particles, the particles being sunk in the mineral binder, the volume fraction of vegetal material particles in the third mixture being greater than 50%;
wherein the walls define a vertical groove on their external surface extending over the height of the walls and opening onto the first metal rods salient from the support.

According to one feature of the invention, the first metal rods define at least one ring and/or a hook salient from the support forming the connectors.

In preferential manner, the first metal rods have an ascending connecting portion salient from the support, the ascending connecting portion being angled to be installed in the vertical groove of the external surface of one of the walls.

Advantageously, the first metal rods have a descending connecting portion arranged salient from the support, the descending connecting portion being angled to be salient from the floor in the continuation of the longitudinal direction of the vertical groove of one of the walls.

In a particular embodiment, the walls are fixed to the floor by means of a plurality of screws.

According to another feature, one wall of the plurality of walls is formed by two single-piece parts made from the third mixture and separated from one another by a housing, the housing being filled with hardened concrete and at least one metal rod at least partially sunk in the hardened concrete, the concrete having a volume content of vegetal material particles that is lower than that of the third mixture or zero.

It is a further object of the invention to achieve a building that is easy to construct while being sufficiently strong to support several storeys.

This result tends to be achieved by means of a building comprising a first and second building block according to any one of the foregoing configurations. The first building block is erected adjacent to the second building block so that the vertical groove of the first building block is facing the vertical groove of the second building block to form a first mould receiving a concrete pylon.

In a particular embodiment, the building comprises a third and a fourth building block according to any one of the foregoing configurations. The third building block is erected adjacent to the fourth building block so that the vertical groove of the third building block is facing the vertical groove of the fourth building block to form a second mould receiving a concrete pylon, the third building block being erected on the first building block, the fourth building block being erected on the second building block, the second mould extending the first mould.

It is a further object of the invention to provide a method that enables a building to be easily constructed from building blocks. Such a result tends to be achieved by means of a method that comprises:
- providing a first and a second building block according to any one of the foregoing configurations;
- arranging the first building block adjacent to the second building block so that the vertical groove of the first building block is facing the vertical groove of the second building block to form a first mould;
- casting concrete in the first mould to form a concrete pylon.

DESCRIPTION OF THE DRAWINGS

Other advantages and features will become more clearly apparent from the following description of particular embodiments and implementation modes of the invention given for non-restrictive example purposes only and represented in the appended drawings, in which:

FIG. 10 schematically illustrates a perspective view of another embodiment of the flat panel;

FIG. 11 schematically illustrates the steps of a method for constructing a wall with a reinforcement part embedded in the wall;

FIG. 12 schematically illustrates the steps of another method for constructing a wall with single-piece parts connected by a reinforcement part;

FIG. 13 schematically illustrates an embodiment of a wall fixed to a floor, in cross-section.

DETAILED DESCRIPTION

Figure 1:
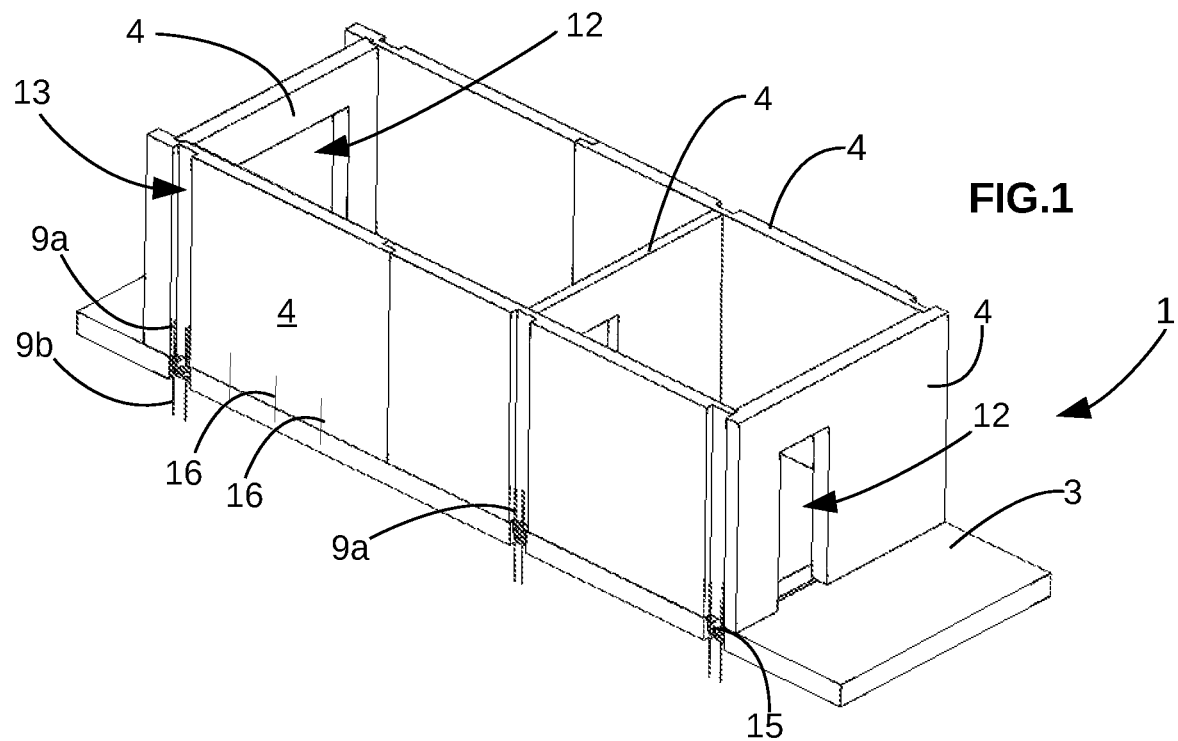
FIG. 1 schematically illustrates a perspective view of a building block according to the invention.
Figure 2:
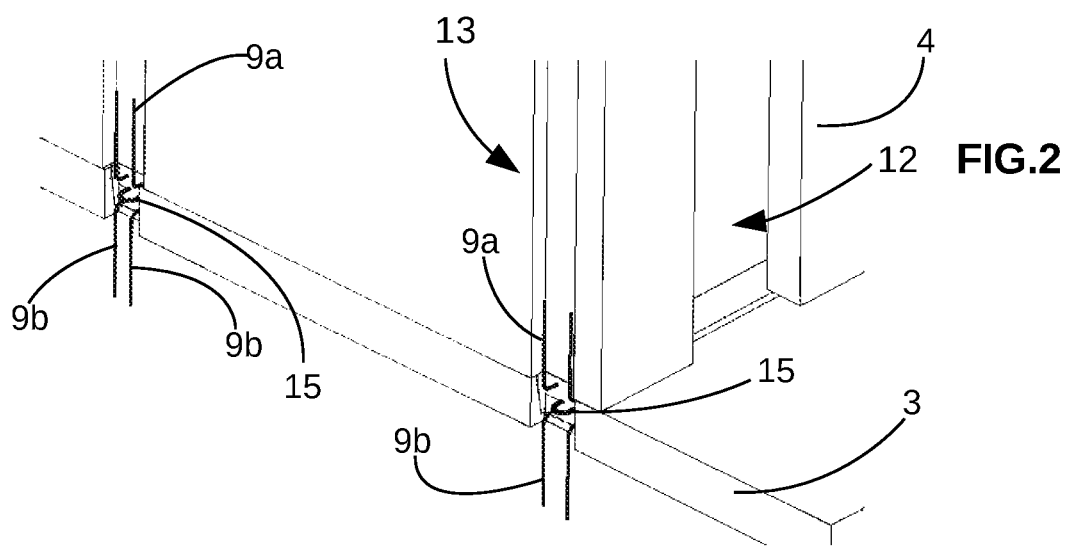
FIG. 2 schematically illustrates a perspective view of the connection means between the floor in a building block according to the invention.
Figure 3:
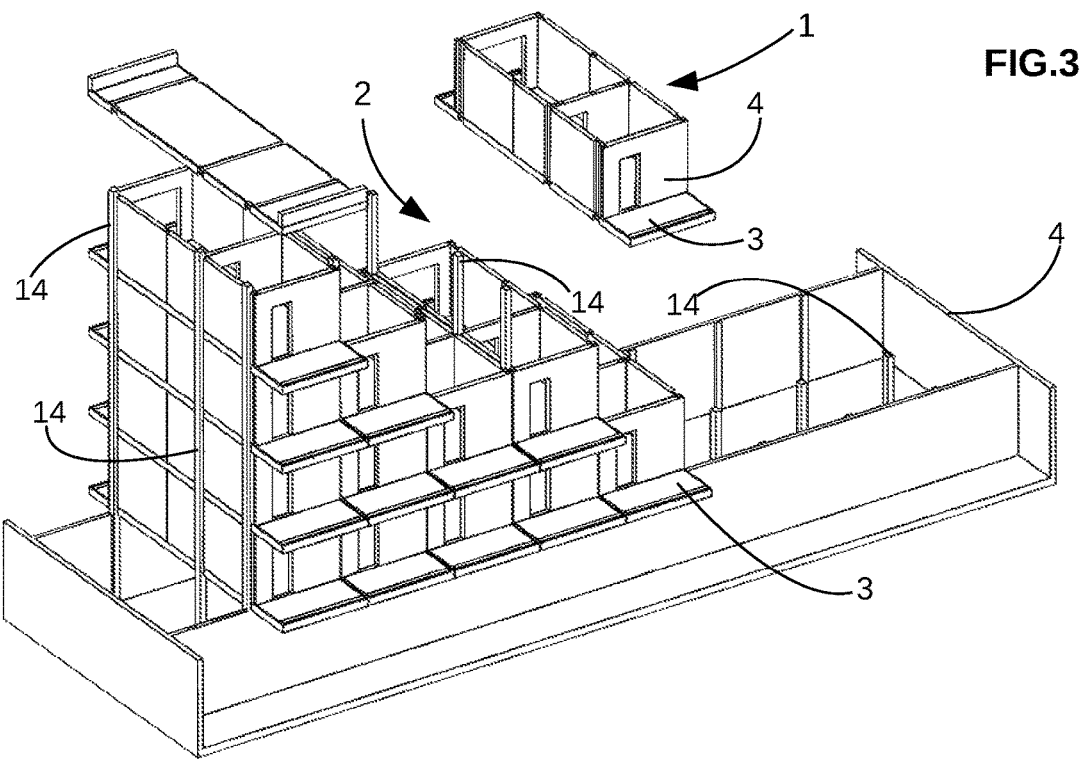
FIG. 3 schematically illustrates a perspective view of a building formed by a plurality of building blocks erected on one another and side by side.

FIGS. 1 to 3 illustrate one or more building blocks 1 that are modular blocks for construction of a building 2. The building block 1 has the floor 3 and a plurality of the walls 4. The floor 3 and the walls 4 are secured to one another to form a single-piece the building block 1. The building block 1 can be transported and hoisted by conventional transportation and hoisting means. It is preferable for the building block to have a width less than or equal to 4m and a length less than or equal to 25m. It is also preferable for the building block 1 to have a weight of less than 70 Tonnes.

In order to provide a technical solution that is advantageous from an economical and mechanical standpoint, trade-offs have to be made as regards the formation of the floor 3 and the walls 4.

Figures 4, 4A:
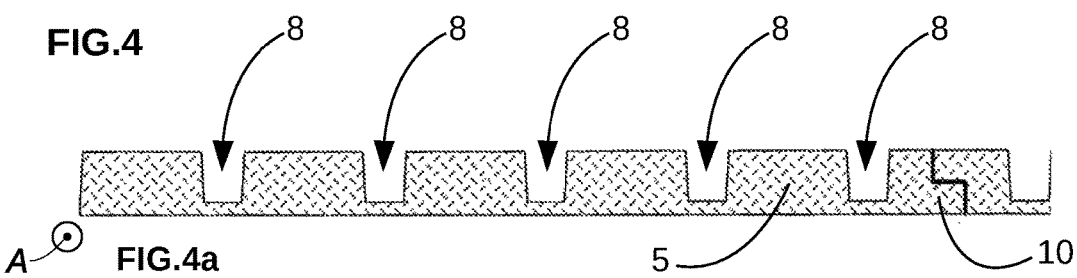
FIG. 4 schematically illustrates a sectional view of a method for constructing a floor.
Figure 4B:
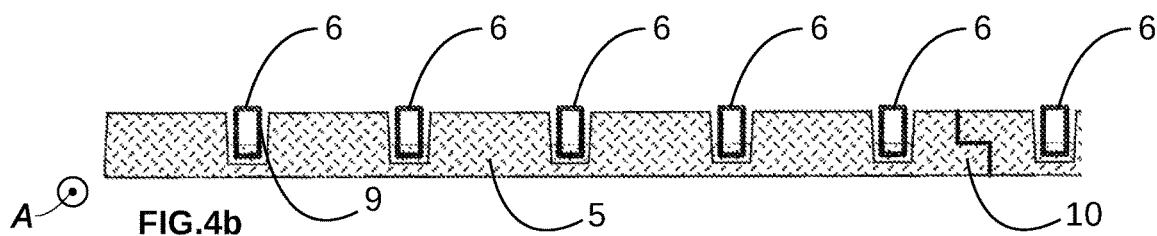
Figure 4C:
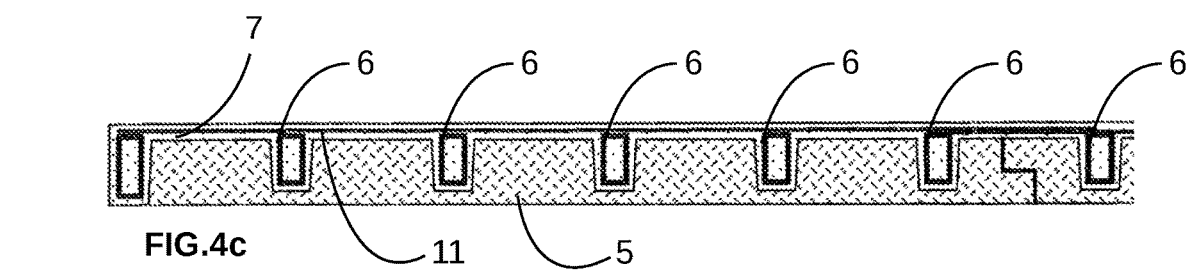

In FIG. 4, through FIGS. 4a, 4b and 4c, an embodiment of the floor 3 has been represented. The floor 3 comprises a support 5, a metal armature 6 and a covering layer 7. The support 5 can be a single-piece part or the support 5 is formed by several parts assembled to one another as illustrated in FIGS. 4a to 4c.

According to a preferred embodiment, the support 5 is made from a first material. The first material is a first mixture containing a mineral binder and particles of a vegetal material. The mineral binder is preferentially cement or concrete. The first mixture comprises a volume fraction of at least 50% of vegetal material particles. This high vegetal material particle content enables the density of the support 5 and therefore the final weight of the building block 1 to be reduced in comparison with an equivalent made from concrete. The vegetal material particles are sunk in the mineral binder, i.e. the particles are completely covered by the mineral binder except possibly on the external surfaces of the support 5. The vegetal material particles have a maximum dimension that is smaller than the thickness of the support 5. The vegetal material particles are bonded to one another by the mineral binder. The vegetal material particles can be of different sizes. The organic element of vegetal origin can be wood, straw, cellulose, hemp or cork. The vegetal material particles are preferentially wood particles. In preferential manner, the vegetal material particles are mainly wood (in volume). The wood elements are wood chips having a length comprised between 1 and 100 mm. Preferentially, the wood chips have a length comprised between 1 and 60 mm. In preferential manner, the wood elements present a maximum mass concentration comprised between 20 and 60 mm. These wood chips have a thickness comprised between 1 mm and 5 mm. When wood chips having a length of between 1 and 100 mm are used, microcavities are obtained at the surface of the part due to the fact that the concrete coats the wood chips. More particularly, a distribution of the cavities on the surface is obtained representing between 30% and 50% of the total surface of the part. Furthermore, a roughness comprised between 6 and 15 mm is obtained. The roughness corresponds to the maximum height between a peak and a valley of the surface.

It is noteworthy that rough cast concrete, i.e. construction elements made from rough concrete with a formwork, have a roughness comprised between 0.3 and 3 mm and a distribution of the cavities on the surface of less than 30% of the total surface of the construction element. In this way, by means of the mixture using chips with a length comprised between 1 and 100 mm and more preferentially between 20 and 60 mm, more microcavities are created and the microcavities are deeper than with a rough cast concrete. A part made from such a material procures large microcavities, in number and in depth, enabling a subsequently deposited curable mixture to penetrate into these microcavities. A strong bond is thereby obtained between the curable mixture and the part made from hardened mixture, preferably from hardened wood-concrete. Furthermore, a weight ratio of wood chips can be used comprised between 30% and 70% of the total weight of the part to be produced.

The first mixture is a mixture containing a mineral binder, for example concrete in which particles of a vegetal element for example wood are sunk. The mineral binder is a binding material that is configured to bind the vegetal material particles to one another. Preferentially, the mineral binder is chosen from a cement, blast furnace slag or lime. It is also possible to use a concrete that is a mixture containing water, a binder for example cement, and other elements for example sand and possibly gravel. A wood concrete is loosely described as a mixture containing wood particles and a mineral binder chosen from a cement, blast furnace slag, lime or concrete.

The material charged with vegetal particles, preferably wood-concrete, gives the floor 3 an improved fire-resistance property. Wood is in fact a better thermal insulator than the sand used in conventional concretes. Furthermore, the mineral binder coats the elements of vegetal origin such as wood and protects them from flames. It was observed that under the effect of a fire, the material formed by the first mixture expands less than its equivalent made from rough concrete or than a floor made from steel. It was also observed that the floor does not explode under the thermal stress of the fire or does so much later.

The support 5 presents an upper surface that is textured. The support 5 defines the first grooves 8 and second grooves. The first grooves 8 present a first longitudinal direction that extends in a first direction A. The second grooves present a second longitudinal direction that extends in a second direction that is secant to the first direction, for example perpendicular. The first grooves 8 and the second grooves belong to the same plane.

Floor 5 also comprises a metal armature 6 comprising a plurality of first metal rods 9 that are arranged in the first grooves 8 and a plurality of second metal rods that are arranged in the second grooves.

In preferential manner, the first metal rods 9 are mechanically fixed to the second metal rods so that the first and second metal rods form a self-supporting metal armature 6. The mechanical connections perform transmission of forces even without a concrete mixture in hardened state.

The metal armature 6 is installed inside the grooves of the support 5 and a liquid material is poured in so as to fill the first grooves 8 and the second grooves completely and so as to cover the upper surface of the support 5 and sink the metal armature 6. The liquid material is a second mixture that comprises a mineral binder, for example cement or concrete. The second mixture in hardened state presents a flexural strength that is greater than that of the first mixture forming the support 5. The second mixture has a volume fraction of vegetal material particles of less than 20%. Once it has hardened, the second mixture, in association with the metal armature 6, gives the floor 3 a high mechanical strength in comparison with the strength that the support 5 can procure on its own, including with the same volume of the floor 3 and including with the metal armature 6. The association of the support 5, the metal armature 6 and the covering layer 7 enables a panel to be achieved with a mechanical strength that is compatible with use as a floor while having a lesser weight. In preferential manner, the first and second metal rods are inserted in the first and second grooves to provide an enhanced flexural strength in comparison with an equivalent structure without the metal rods.

The first grooves 8 can present a cross-section that is identical to or different from the cross-sections of the second grooves. The first and second grooves can present a cross-section chosen from a square, rectangular, triangular or trapezoidal cross-section or a cross-section of any shape.

In preferential manner, several metal rods are inserted in each groove. In the grooves, the multiple metal rods are arranged with respect to one another to form a three-dimensional structure, for example in the form of a tube. The rods extend in the longitudinal direction of the grooves that they fill. The metal armature 6 is perforated to enable the second mixture in liquid state to pass through.

By using a support 5 that comprises at least 50% volume of vegetal material particles, the support 5 presents a high surface porosity. The support 5 has rough spots on its surface that are introduced by the vegetal material particles. The rough spots on the surface procure a large roughness which enhances the mechanical strength between the second mixture and the support 5. The porosity of the support 5 is particularly advantageous as it procures a good mechanical strength between the support 5 on the one hand and the covering layer 7 that is reinforced with the metal armature 6 without having to form grooves 8 having a specific shape or without having to add an additional attachment element.

In advantageous manner, one or more screws are screwed into the first grooves 8 and/or the second grooves of the support 5 before the second mixture is poured in so as to better secure the support 5 and the covering layer 7 formed from the second mixture which has hardened.

It is particularly advantageous for the metal armature 6 to only have connections between the first metal rods 9 and the second metal rods in the connection areas between the first grooves 8 and the second grooves. As an alternative, additional metal rods connect the first metal rods 9 and the second metal rods above the side surfaces delineating the grooves. In this embodiment, the thickness of the covering layer 7 can be larger to cover the metal armature 6 completely.

It is possible to provide for at least a part of the first rods 9 to be fixed on the support 5, for example by screw-fastening of an attachment part that performs the mechanical connection between the first rods 9 and the support 5. The same can be the case for the second rods and the support 5.

In a particular embodiment, first rods 9 of one and the same first groove 8 are arranged between one another to form a first joist, i.e. a structure that is mechanically self-supporting without the assistance of the support 5 and without the assistance of the second mixture. The same can be the case for the second rods in the second grooves. What is meant by self-supporting is that the joist supports its own weight.

It is advantageous for the first joists in the first grooves 8 and/or the second joists in the second grooves not to be in direct contact with the support 5. It is advantageous for the joists to be separated from the support 5 by the second mixture as illustrated in FIG. 4b. The support 5 is formed from a material having a high vegetal material particle content and it is porous and advantageously perspiring. It is preferable to cover the metal armature by the covering layer completely in order to protect the metal armature from the moisture passing through the support 5.

It is possible to pour a part of the second mixture into the bottom of the first grooves 8 and/or of second grooves before installing the rods of the metal armature 6. Once the second mixture has solidified, the rods of the metal armature 6 are installed in the second mixture which can have the consistency of a paste. The second mixture is viscous enough to oppose collapsing of the metal armature 6 under its own weight.

Once the second mixture has solidified or during solidification of the second mixture present in the bottom of the grooves, the rest of the second mixture is poured in to fill the grooves.

As an alternative, the metal armature 6 is kept at a distance from the bottom of the grooves by a support device, for example a crane or an equivalent device or by pins arranged in the bottom of the grooves. The second mixture is poured in while the metal armature 6 is supported.

The metal armature 6 is separated from the bottom surface of the floor 3 by the support 5 that contains particles of a vegetal element. The floor 3 presents a good thermal resistance. This configuration improves the fire-resistance property of the floor 3. When flames are in contact with the bottom surface of the floor 3, the flames are not in direct contact with the joists. The support 5 limits propagation of the heat in case of fire. Furthermore, the support 5 made from a first mixture protects the joists from excessive expansion which may occur in case of fire.

In a particular embodiment, the apex of the metal armature 6 has an apparent part, i.e. that is salient from the second mixture and from the grooves. The plate formed at this stage of the method is lightened as the metal armature 6 is not completely coated.

The second mixture is mainly or exclusively a mineral binder performing securing, for example a concrete or a cement. The concrete is a mixture of different elements such as gravel, sand, a binder and water. The binder can be a cement or lime. The proportions of the different elements of the concrete vary according to the hardness of the concrete that is required.

In a particular embodiment, one end or at least one end of a support 5 has a link part 10. The link part 10 is configured to operate in conjunction with the complementary link part 10 of an adjacent support 5 to form a larger the floor 3 as illustrated in the drawings of FIG. 4. In a particular configuration, supports 5 are used separately to form parts of the floor 3 and the parts of the floor 3 are associated with one another to form the floor 3. In another embodiment, supports 5 are associated with one another and the metal armature 6 is common to the two adjacent supports 5. It is also advantageous to pour the second mixture onto the two adjacent supports 5 to form a mechanical unit.

In one embodiment, a single pouring step of the second mixture is performed to fill the grooves and cover the metal armature 6 completely and form the covering layer 7. The composition of the second mixture is substantially identical over the whole height of the covering layer 7. In an alternative embodiment, the covering layer 7 is achieved with several successive pouring steps of the second mixture. The composition between the pouring operations can be identical or it can vary. It is possible to provide for the top part of the floor 3 to be formed by a layer of concrete that is devoid of vegetal material particles or even for the whole of the covering layer 7 to be a concrete devoid of vegetal material particles.

In a particular configuration illustrated in FIG. 4*c*, the first joists are joined to one another by a grid 11 that is arranged above the grooves. The grid 11 can be fixed to the joists for example by welding or by other means, for example cables are used to form a mechanical connection without the second mixture. As an alternative, the mechanical link between the grid 11 and the joists is formed by the second mixture.

FIGS. 4*a* to 4*c* represent a particular embodiment of an implementation mode of a method for constructing a floor. The method for constructing the floor comprises:

providing a single-piece support 5 defining the first grooves 8 and the second grooves;

placing the first metal rods 9 in the first grooves 8 and the second metal rods in the second grooves, the first and second metal rods preferentially forming a self-supporting the metal armature 6, pouring the second mixture into the first grooves 8 and the second grooves so as to form a reinforced beam in each of the first and second grooves and to secure armature 6 to the support 5. The reinforced first and second beams extend in secant directions in the same plane.

In FIG. 4*c*, an implementation mode of a method for constructing a floor 2 has been represented and the method further comprises:

providing the floor 3 as defined in the foregoing; and pouring a covering layer 7 forming the top part of the floor 3.

The covering layer 7 is formed from the second mixture that preferentially mainly or exclusively contains concrete. When the concrete coating is cast, the metal grid 11 can be added so as to provide a covering layer 7 made from reinforced concrete.

Figure 5:
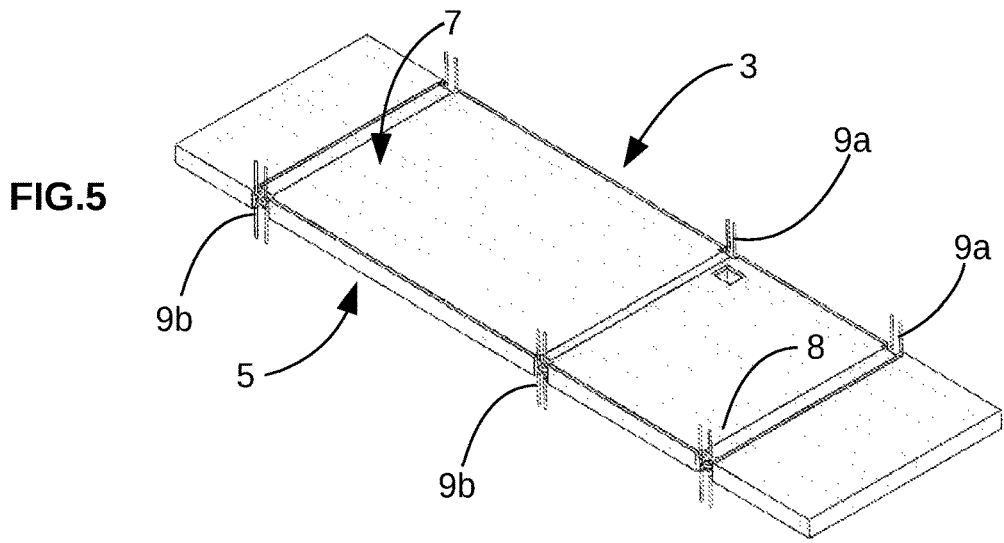
FIG. 5 schematically illustrates a perspective view of an embodiment of a floor.
Figure 6:
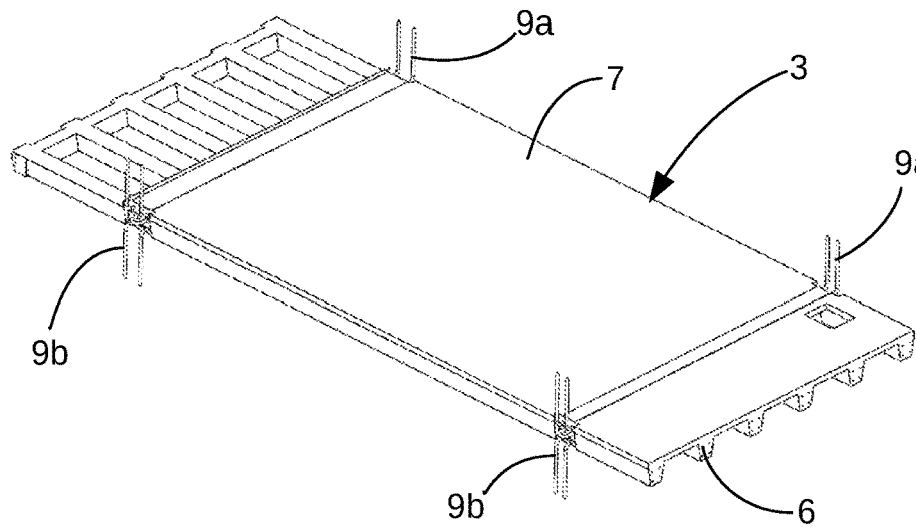
FIG. 6 schematically illustrates a perspective view of a floor in which the support and a part of the covering layer have been eliminated.

As illustrated in FIG. 5, the floor 3 comprises several reinforced first beams arranged horizontally or substantially horizontally. The first beams extend in the first direction A. The first beams are connected to one another by reinforced second beams that extend in a second direction secant to the first direction. The reinforced beams form a support grid on which the connectors arranged salient from the support are fixed. The support grid provides the mechanical strength of the building block during the hoisting operations. The holes of the support floor are filled by the first mixture that is less dense than the material forming the support grid. FIG. 6 illustrates a configuration in which the support 5 has been eliminated. In the right-hand part of the floor 3, the covering layer 7 is present. The latter has been eliminated in the left-hand part which then represents the reinforced beams.

This configuration enables the floor 3 of lesser weight to be formed due to the use of a support 5 charged with vegetal particles and having a sufficient strength to support the mechanical stresses corresponding to the floor 3.

The floor 3 has connectors that are salient from the ends of the first grooves 8, i.e. beyond the support 5. The connectors are configured to perform hoisting of the building block 1 during the transport and positioning phases. The connectors are fixed to the reinforced beams to enable the building block to be hoisted solely by means of the floor 3.

The building block 1 has a wall 4, among the plurality of walls 4, that comprises a recess box 12. The recess box 12 defines for example a door, a window, french windows or a through passage between two building blocks.

The walls 4 are fixed to the floor 3 and the walls 4 are fixed to one another. The walls 4 and the floor 3 form a transportable single-piece element. The structure is sufficiently solid and rigid to allow transportation of the building block without resulting in deformation of the interior fittings formed inside the building block. For example, the building block can have one or more windows and/or one or more doors. It is also possible for the block to have electric circuitry and/or hydraulic circuitry before being coupled to another the building block 1.

The walls 4 of the plurality of walls 4 are made from a third mixture that comprises a mineral binder and vegetal material particles. The vegetal material particles are sunk in the mineral binder, the volume fraction of vegetal material particles in the third mixture being more than 50%. The third mixture comprises at least 50% volume of vegetal material particles. This high vegetal material particle content enables the density of the wall and therefore the final weight of the building block 1 to be reduced. The vegetal material particles are sunk in the mineral binder, i.e. the particles are completely covered by the mineral binder with the possible exception of the external surfaces of the wall. The vegetal material particles have a maximum dimension that is smaller than the thickness of the wall 4. The vegetal material particles are bonded to one another by the mineral binder. The vegetal material particles can be of different sizes. An organic element of vegetal origin can be wood, straw, cellulose, hemp or cork. The vegetal material particles are preferentially wood particles. In preferential manner, the vegetal material particles are mainly wood (in volume). The third mixture is compliant with the definition given in the foregoing for the first mixture. In a particular embodiment, the third material forming the walls 4 is identical to the first material forming the support 5.

The walls 4 are made from a material that is lighter than the equivalent made only from concrete or reinforced concrete which enables a lighter and therefore more easily transportable building block to be formed. The walls made from mineral binder and from vegetal material particles are less mechanically efficient than their equivalent made from concrete and from reinforced concrete. The walls are devoid of connectors for hoisting the building block as the walls are not able to support such an operation. The walls can be devoid of a metal grid. It is advantageous for the vegetal material particle content to be identical from one end of the wall to the other in the lengthwise direction and in the heightwise direction which makes the latter easier to manufacture and reduces the risks of stresses and therefore of accelerated ageing linked to differential expansion phenomena.

The walls 4 define a vertical groove 13, on their external side, extending over the height of the walls 4. The vertical groove 13 preferentially opens onto the connectors salient from the floor 3 and in particular from the support 5 and from the reinforced beams. The use of the walls 4 made from a material comprising a mineral binder and vegetal material particles enables a perspiring wall to be formed which improves the quality of life in the dwelling. However, the use of the walls 4 made from mineral binder with vegetal material particles results in an impairment of the mechanical performances of the walls 4 which greatly complicates installation of a heavy roof or construction of a building 2 with several storeys.

The building block 1 is advantageous as groove 13 forms a part of mould for manufacturing a vertical pylon 14 or a vertical post. The vertical pylon 14 is made from concrete or from any other material presenting higher mechanical performances than those of the material forming the walls 4, for example the second mixture. The material is poured into the mould to form pylon 14. The vertical pylon 14 is formed by a fourth mixture that can be a concrete devoid of vegetal material particles or a concrete that contains a volume fraction of less than 20% of vegetal material particles.

Once the building block 1 has been installed, it is possible to form a reinforcement pylon 14 quickly, as illustrated in FIG. 3. The wall 4 is made from a material containing a large proportion of vegetal particles which generates roughness. The concrete cast in groove 13 will penetrate into the crevices thereby improving the mechanical connection between pylon 14 and the wall 4.

In advantageous manner illustrated in FIGS. 1 and 2, the floor 3 comprises a recess at the end of the first grooves 8. The recess makes it possible to have connectors that are arranged salient from the first groove 8 so as to be easily accessible without increasing the bulk of the building block 1. In preferential manner, except for the recesses, the external surface of the wall 4 is flat or substantially flat and the connectors are not salient from this flat surface so that pylon 14 can be formed in the initial volume of the building block 1. Installation of the connectors in a recess of the building block 1 enables the building block 1 to be placed in contact or almost in contact with an adjacent building block. The recess is preferentially present in the support 5.

In advantageous manner, one or more rods or screws are installed in the vertical groove 13 before the fourth mixture is poured in so as to increase the quality of the mechanical link that exists between the wall 4 and pylon 14.

In a particular embodiment, the connectors define at least one ring 15 and/or a hook salient from the floor 3 for hoisting the building block 1. The first metal rods 9 are installed in a beam made from concrete or any other material having a higher mechanical strength than the support 5. The rings/hooks 15 are fixed in the reinforced concrete beams which enables hoisting of the building block to be performed easily by means of the floor 3 and not by means of the walls 4. Preferentially, the first metal rods 9 define the at least one ring 15 and/or a hook salient from the support 5 forming the connectors.

The document WO2020/016531 discloses a floor formed by a support made from a curable material coating the wood particles and defining grooves receiving reinforcements. Unlike this prior art, it is proposed to use the strength of the floor 3 to support the prefabricated building block and to use metal rods 9 fixedly secured to the floor to perform strain take-up of the final construction.

In a particular embodiment, at least one recess and preferably each recess has a connector in the form of a ring or a hook to perform hoisting of the building block 1 and an additional armature preferentially in the form of a ring and designed to transmit the forces between the floor 3 and pylon 14. The additional armature preferentially corresponds to one or more rings that are larger than the ring of the connector. The additional armature can be formed by one or more first metal rods 9.

In another particular embodiment, the first metal rods 9 have a first connecting portion or ascending connecting portion 9a that is fitted salient from the support 5 and that is angled to be installed in the vertical groove 13 of the external surface of one of the walls 4. When the pouring operation of the fourth mixture is performed to form reinforcement pylon 14, ascending connection portions 9a that ascend along the wall 4 increase the strength of pylon 14 and in particular enhance the vertical mechanical performances of the building block 1. The first metal rod 9 ensures the mechanical continuity of strain take-up between the floor 3 and reinforcement pylon 14.

It is also advantageous to provide for the first metal rods 9 to have another connecting portion, called descending connecting portion 9b, that is arranged salient from the floor 3 and in particular salient from the support 5 and that is angled to be salient downwards from the floor 3 in the continuation of the longitudinal direction of the associated vertical groove 13 so as to be inserted in the vertical groove 13 of the bottom building block.

In others words, the connecting parts 9a and 9b are angled and directed downwards under the level of the floor 3 or upwards along the wall 4. The first rods 9 extend in the plane of the floor 3 in the longitudinal direction of the first grooves 8 before bending. The first rods 9 also extend in the vertical groove 13 in a perpendicular or substantially perpendicular direction to the top surface of the floor 3. The first rods 9 extend continuously from the first grooves 8 up to vertical grooves 13 of the building block 1 or of bottom the building block 1.

It is advantageous to provide for formation of a slab designed to support the building block 1 and to form a hole inside the slab to receive descending connecting portions 9b directed downwards. When the pylon 14 is cast, it comprises a part forming a reinforced portion that extends inside the slab. This configuration is also very advantageous when several building blocks 1 are erected on one another. The vertical groove 13 of bottom the building block 1 is extended by the vertical groove of top the building block 1. The downward-angled metal rods 9 improve the strength of reinforcement pylon 14 in the portion providing the mechanical connection between the floor 3 of the upper level and the portion of pylon 14 of the bottom level. FIG. 3 illustrates an embodiment where pylon 14 extends over several storeys and connects several building blocks 1 erected on one another.

In advantageous manner, once bottom the building block 1 has been placed, pylon 14 is partly cast. Pylon 14 is not formed over the whole height of the wall 4 but only over a part so as to leave room for the insertion of the angled descending connecting portions 9b of top the building block 1. The portion of pylon 14 that was cast reinforces the strength of the wall 4 of the block already in place which enables the installation of top the building block 1 on bottom the building block 1 to be withstood. Once top the building block 1 has been placed on bottom the building block 1, a new batch of concrete can be cast to extend reinforcement pylon 14 over an additional storey. Reinforcement pylon 14 is preferentially formed storey by storey as the building blocks 1 are progressively erected on one another. This construction relieves the mechanical stresses on the walls of the building blocks thereby enabling the weight of the building block to be reduced. As an alternative, pylon 14 is cast in one go for several storeys. It is further possible to provide for the pylon to be formed in several steps. For example, the pylon extends over several storeys, preferably at least four storeys, and the pylon is constructed in at least two or three stages.

In preferential manner, pylon 14 has several metal rods sunk over its height to form a reinforced pylon.

It is possible to form a building 2 comprising a ground floor and one or more storeys using the building blocks 1 stacked on one another. In preferential manner, the walls are devoid of reinforcement metal rods to limit the weight of the walls and therefore the weight of the building block. By abstaining from using reinforcement metal rods, it is more difficult to take up vertical forces, i.e. the weight of the building blocks and other loads placed on the building block. In the absence of metal rods, it is more difficult to support the dynamic forces, for example the stresses present in seismic areas or wind. However, by forming a reinforcement pylon 14 that extends from the ground and that continuously connects all the building blocks 1 stacked on one another, the structure can be reinforced. A building block 1 is provided presenting the advantage of a reduced weight thereby facilitating transport and positioning of the building block 1. A step is then performed to reinforce the walls 4 by means of a pylon 14 that is a vertical beam fixed to the ends of first rods 9. This architecture enables a strong support structure to be formed with few additional operations after the building block 1 has been installed. Pylons 14 are fixed directly to the floors 3 by means of the first metal rods 9. Vertical pylons 14 and the reinforced beams of the floor 3 form the support framework of the building.

To secure the walls 4 to the floor 3, it is advantageous to use screws 16. The screws 16 pass through the covering layer 7 to secure a wall 4 to the support 5. The high content of vegetal material particles enables screw-fastening to be performed directly in the wall 4 without having to drill a hole beforehand and without having to use a dowel or a chemical sealing. The same is the case for the support 5. It is therefore advantageous to fix the wall 4 to the support 5 by means of one or more screws 16 without using chemical sealing and without a dowel. The screw 16 is directly in contact with the vegetal material particles. In comparison, in a concrete structure, it is necessary to drill a hole beforehand and to then fill this hole with a dowel or by chemical sealing to make sure that the screw remains in place in spite of the stresses. It is also possible to perform fixing of the wall 4 with the floor 3 by means of an adhesive, for example an adhesive concrete or an adhesive mortar, associated with screws or not.

In another embodiment illustrated in FIG. 13, a metal link 17 provides the mechanical connection between the wall 4 and the floor 3. In a preferential embodiment, a part of the metal link 17 is sunk in the wall 4. The wall 4 is constructed by pouring the third mixture into a mould. A part of the metal link 17 is installed in the mould so as to be completely coated by the third mixture. When the third mixture hardens, the metal link 17 becomes undetachable from the wall 4. Advantageously, the metal link 17 has anti-rotation means of the metal link 17 with respect to the wall 4 and means preventing translation of the metal link 17 with respect to the wall 4. It is preferable for the metal link 17 to be secured fixedly to the wall 4.

The salient portion of the metal link 17 is installed in the floor 3. In preferential manner, the salient portion of the metal link 17 is installed in the mould used to form the floor 3. Advantageously, the salient portion is installed in the mould used for pouring the second mixture. The salient portion is then incorporated in one of the reinforced beams of the floor 3. The salient portion is mounted fixedly with respect to the floor 3. It is preferable for the metal link 17 to present an angled portion that constitutes the mechanical link between the wall and the floor.

In a particular embodiment, the metal link 17 is salient from the bottom surface of the wall 4. The bottom surface of the wall 4 is placed on the support 5 which forms the mould for pouring the second mixture. The second mixture is poured in filling the grooves of the support 5, the metal armature 6 and the metal link 17 preferably until the bottom surface of the wall 4 is reached. Once the second mixture has hardened, the wall 4 is sealed to the floor 3.

In order to enhance the strength of the building block 1, the walls 4 are preferentially fixed to a reinforcement ring arranged in the top part of the walls 4. The reinforcement ring enables the flexion of the wall 4 with respect to its attachment point on the floor 3 to be reduced. The reinforcement ring or reinforcement block can made from wood or from metal or from any other suitable material.

In preferential manner, a building 2 comprises two building blocks 1 arranged adjacent on the same level so that vertical grooves 13 are located facing one another and form a first mould extending over the height of the walls. The two vertical grooves 13 open onto one another on the ends of first rods 9 that are salient from the two floors 3 that are also arranged adjacently. The ends of first rods 9 of the two building blocks 1 are present in the same mould. The mould is open at its top portion to enable the fourth mixture to be poured in. The mould is advantageously open in its bottom part to let the connecting portion 9b pass if need be.

The two vertical grooves 13 formed in the external surfaces of the two adjacent building blocks 1 join up to form a first mould that opens onto the first metal rods 9. The two external surfaces of the walls 4 are in contact or are separated by a distance such that, when the fourth mixture is poured into the mould, the fourth mixture remains in the mould. The fourth mixture fills the mould and remains in the mould or extends over a distance of a few centimetres outside the mould. The fourth mixture fills the mould and covers the ends of first rods 9 of the two building blocks 1 completely. When the fourth mixture hardens, it provides the mechanical connection between the two floors 3 and the two adjacent walls 4.

In preferential manner, two adjacent building blocks of the same storey are separated by an insulating material, for example a thin layer of air to reduce the thermal conduction between two walls. It is advantageous to place a compressible material, preferably a compressible insulating material, on the wall 4 in the extension of the lateral surfaces of the vertical groove 13. When two building blocks 1 are placed in contact, the compressible material compresses and ensures sealing of the mould before the fourth mixture is poured in. The compressible material is thermally insulating when it has a higher thermal resistance than that of the material forming the wall 4.

It is also possible to install metal rods in the mould formed by the two lateral grooves 13 to enhance the strength of pylon 14.

When the building 2 comprises two adjacent building blocks 1 on the same storey and two adjacent building blocks 1 on a higher level, vertical grooves 13 of one and the same level are arranged facing one another to form a first mould and a second mould. The two moulds join one another and extend one another. Pouring of the fourth mixture enables a pylon 14 to be formed mechanically coupling the adjacent walls 4 of the two levels and the two floors 3. The pylons 14 form a concrete framework ensuring the mechanical strength of the building 2.

The building blocks 1 provide a greater freedom in construction of the buildings 2. The use of a mixture of a mineral binder and vegetal material particles with a volume fraction of more than 50% enables the walls 4 to be formed presenting a good acoustic insulation and a good fire resistance while taking advantage of the speed of erection incident to the prefabricated block.

Once the building block 1 has been constructed, it is moved from where it was manufactured to where it is to be used. The building blocks 1 are arranged beside one another or on top of one another to form the building 2. Reinforcement of the mechanical structure of the building is achieved by casting pylons 14 on the external surfaces of the building blocks. It is therefore particularly advantageous to install at least a part of the interior fittings inside the building block 1 as no secondary work is performed on the inner surfaces of the building block when the building 2 is erected. This results in a time saving on construction of the building 2.

Figure 7:
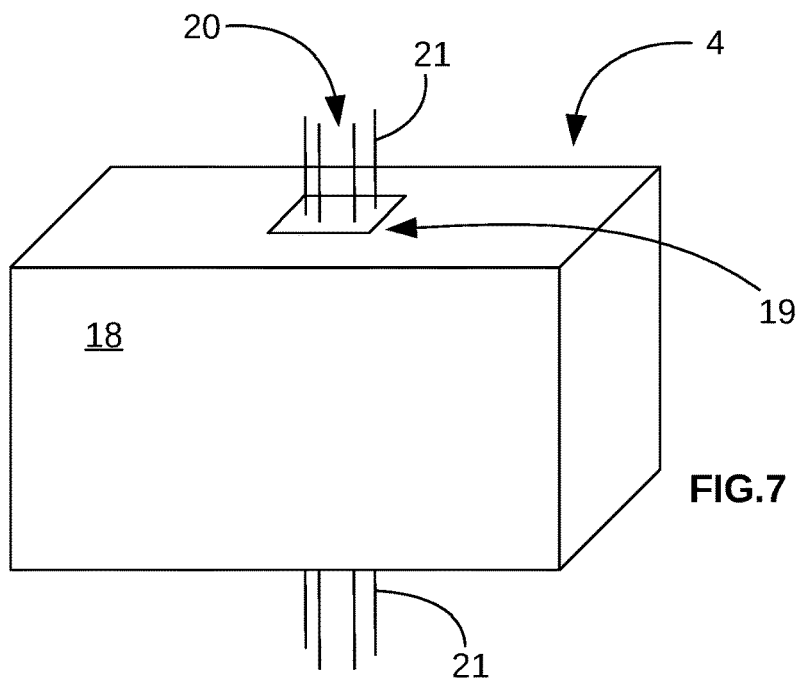
FIG. 7 schematically illustrates a perspective view of an embodiment of a wall.
Figure 8:
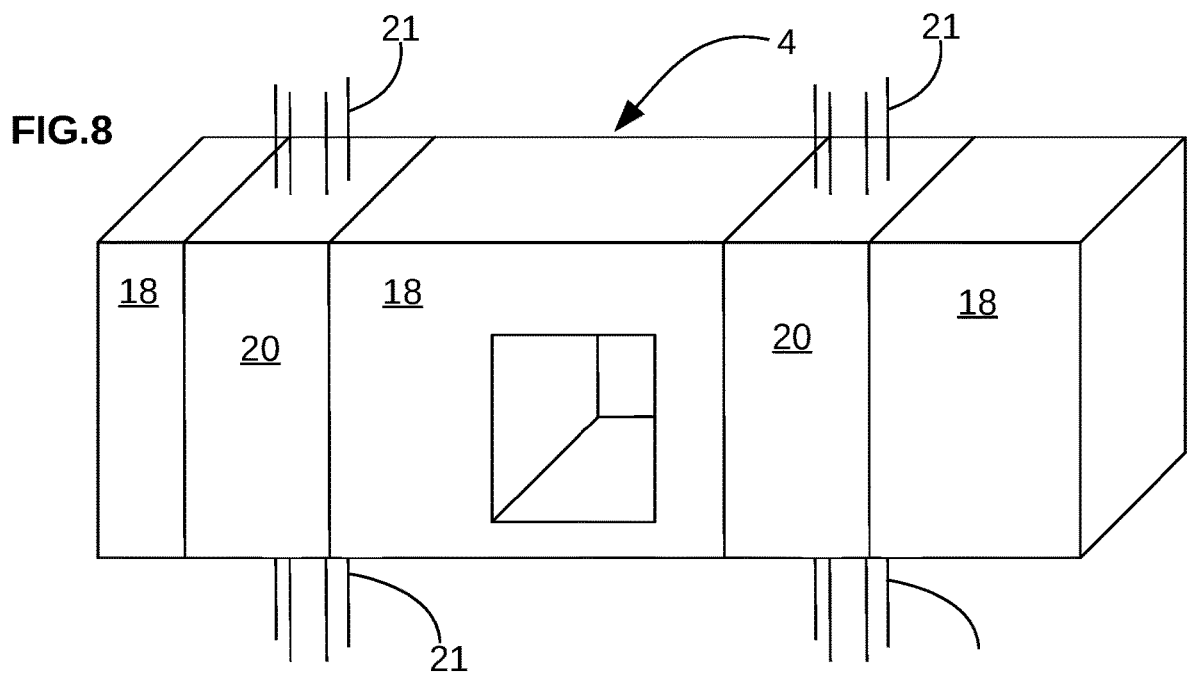
FIG. 8 schematically illustrates a perspective view of another embodiment of a wall.
Figure 9:
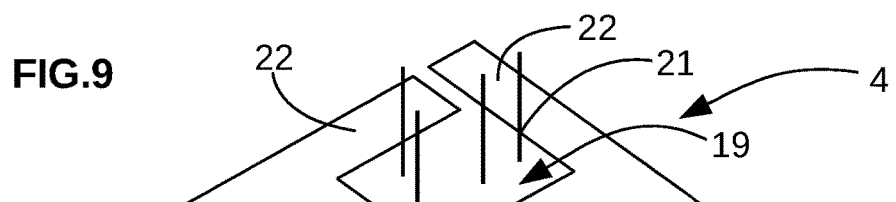
FIG. 9 schematically illustrates a perspective view of a wall at the corner.

In FIGS. 7 to 10, different particular embodiments of a panel designed for construction of a wall 4 have been represented. In particular, FIGS. 7, 8 and 9 illustrate a panel designed for construction of a front wall, i.e. the panel has a globally parallelepipedic shape. FIG. 9 illustrates a panel designed for construction of a corner wall, i.e. the panel comprises two parts perpendicular to one another. In general manner, the panel is particularly suitable for forming a wall of a building with one or more storeys. The panel is designed to be placed vertically with respect to the ground.

Panel 1 comprises at least one single-piece part 18. More particularly the single-piece parts 18 are each made from the third mixture, i.e. a mineral binder such as concrete in which particles of a vegetal element, for example wood, are sunk. The wood elements are wood chips having a length comprised between 10 and 100 mm, preferably between 20 and 60 mm. These wood chips have a thickness comprised between 1 mm and 5 mm. When wood chips having a length of between 20 and 60 mm are used, microcavities are obtained at the surface of the single-piece part 18 due to the fact that the concrete coats the wood chips. More particularly, a distribution of the cavities at the surface is obtained representing between 30% and 50% of the total surface of the single-piece part 18. Furthermore, a roughness comprised between 6 and 15 mm is obtained. The roughness corresponds to the maximum height between a peak and a valley of the surface. It can be noted that the cast rough concrete, i.e. the construction elements made from rough concrete with a formwork, has a roughness comprised between 0.3 and 3 mm and a distribution of the cavities on the surface of less than 30% of the total surface of the construction element. In this way, due to the wood-concrete material using chips with a length comprised between 20 and 60 mm, more microcavities are created and the microcavities are deeper than in a rough concrete. A single-piece part 18 made with such a wood-concrete material procures large microcavities, in number and in depth, enabling a curable mixture to penetrate into these microcavities. A strong bond is thereby obtained between the curable product and the single-piece part 18 made from wood-concrete. Furthermore, a weight ratio of wood chips comprised between 30% and 70% of the total weight of the single-piece part 18 can be used.

The bulk density of the wood-concrete obtained is comprised between 600 and 1000 kg/m$^3$, by varying the composition of the material, and it is preferably equal to 800 kg/m$^3$. A material is thus obtained that is lighter than rough concrete, i.e. a concrete that does not comprise wood elements and has a bulk density of about 2300 kg/m$^3$.

In a particular embodiment, the panel comprises at least one housing 19 designed to receive a reinforcement part 20 presenting a flexural strength. In preferential manner, the housing 19 is pass-through over the height of the wall 4.

A reinforcement part 20 is a part that has an elongate structure configured to improve the flexural resistance of the panel designed to form the wall 4. More particularly, each reinforcement part 20 is formed by one or more mechanical strengtheners 21 in the form of an elongate element 21 coated with a curable product comprising a binder. The mechanical strengthener 21 has an elongate shape. Each mechanical strengthener 21 can be a rod or a bar. For example, a reinforcement part 20 comprising four mechanical strengtheners 21 has been represented in FIGS. 5 to 8. The mechanical strengtheners can be made from glass fibre or carbon and are preferentially made from metal. The curable product is preferably a concrete. The reinforcement part 20 can be a reinforced concrete beam that enhances the flexural resistance of the panel. The use of a reinforcement part 20 formed by a reinforced concrete beam procures a greater flexural resistance in comparison with an equivalent structure totally made from wood or concrete.

The walls 4 made from wood-concrete enable different finishing operations to be performed, such as applying a coating (which is difficult to achieve on cast rough concrete), and they enable securing means of the panels to be fixed directly on site, such as for example metal plates that can be easily screw-fastened directly on the wood-concrete.

FIG. 7 illustrates a the single-piece part 18 with a through hole in the heightwise direction. The wall 4 is in the form of a ring so as to define a housing 19 for provision of the reinforcement part 20. The through hole is not a groove. Unlike a groove, a through hole opens only onto two surfaces of the part.

In FIG. 8, another embodiment of the wall 4 has been represented in which at least two single-piece parts 18 are separated from one another by a reinforcement part 20 that extends over the whole height of the wall and over the whole thickness of the wall 4. The reinforcement part 20 is fixed to the two single-piece parts 18 to form a transportable self-supporting wall 4. In preferential manner, the two single-piece parts 18 are formed beforehand and have salient elements, for example screws that will be sunk in the concrete when the reinforcement part 20 is formed. FIG. 8 also illustrates a recess box 12 passing through the wall 4. As indicated above, the recess box can be used to fit a door or a window.

In FIG. 9, a panel particularly suitable for constructing a corner wall has been represented. The panel comprises the two single-piece parts 18. Each single-piece part 18 is provided with a shoulder 22. The two shoulders 22 are arranged to define a housing 19 designed to receive a reinforcement part 20. The housing 19 is preferentially a through hole over the height of the wall 4. The housing 19 is filled with concrete and with the mechanical strengtheners 21 as described in the foregoing.

As illustrated in FIG. 10, a flat front wall can also be formed using two single-piece parts 18 each provided with a shoulder 22. The two shoulders 22 form a housing 19 designed to receive a reinforcement part 20. The housing 19 is preferentially a through hole over the height of the wall 4. The housing 19 is filled with concrete and with mechanical strengtheners 21 as described in the foregoing.

In preferential manner, a wall 4 provided with a through hole 12 in the direction of the thickness as illustrated in FIGS. 1 to 3 and 8 can be reinforced by a reinforcement part 20. Unlike the previous configurations, the reinforcement part 20 is sunk in the wall 4, i.e. coated by the third mixture on all its surfaces. In preferred manner, the reinforcement part 20 has a lower vegetal particle content than the content of the third mixture to increase the flexural strength. The reinforcement part 20 is preferably made from concrete devoid of vegetal particles and more preferentially associated with metal rods. For example, reinforcement parts 20 are located above and below a recess box 12.

The panels reinforced by reinforcement parts 20 are strong and can be transported easily. They can therefore be prefabricated in plant and then erected on the floor 3. Manufacture of the panels in plant is controlled all the better. However, these configurations are heavier than walls made from the third mixture only. It is therefore advantageous to limit the use of these reinforcement parts to configurations for which the lateral grooves are more difficult to implement or have to be completed by an additional strengthener.

To construct the walls 4 as defined in the foregoing, the at least one single-piece part 18 made from wood-concrete is produced, one or more mechanical strengtheners 21 are placed in a housing 19, and the curable product is then poured into the housing 19 around the mechanical strengthener 21 and in contact with at least one surface of the single-piece part 18. Such a method increases the strength of the bond securing the reinforcement part 20 with the single-piece part 18. The bond between the reinforcement part 20 and the single-piece part 18 is further reinforced due to the microcavities created at the surface of the single-piece part 18 and to pouring of the liquid curable product that penetrates into these microcavities. After curable product 14 has hardened, a bond with a high shear strength is obtained.

FIGS. 11a to 11e illustrate the steps of a method for constructing a wall according to FIG. 7. The method comprises a first step S1 in which the mineral binder in liquid state in which the wood elements are sunk is poured into a mould 23 provided with at least one recess box 24 as illustrated in FIGS. 11a and 11b. For example, a plinth 25 on which the recess box 24 is positioned can be placed at the bottom of the mould 23. After the mineral binder has hardened, the single-piece part 8 is obtained as illustrated in FIG. 11c. Then, in a second step illustrated in FIG. 11c, the recess box 24 is removed to form at least one through hole in single-piece part 8. Then, in a third step illustrated in FIGS. 11d and 11e, one or more mechanical strengtheners 21 are placed in each through hole formed, as illustrated in FIGS. 11d and 11e. For example, one or more mechanical strengtheners 21 higher than the height of single-piece part 8 can be used to obtain one or more mechanical strengtheners 21 having a part salient from the curable product and from single-piece part 8. The salient parts facilitate chaining of two adjacent panels if necessary. For example, another mineral binder in liquid state is used to connect the salient parts of the mechanical strengtheners to one another. Then, in step S2, the curable product comprising a binder is poured into each through hole to coat the mechanical strengtheners 21 and secure the reinforcement part 20 to single-piece part 8, as illustrated in FIGS. 11d and 11e.

In FIG. 12 comprising FIGS. 12a to 12e, the steps of a second implementation mode of a method for manufacturing a panel designed to form a wall 4 have been represented. According to this second implementation mode, a panel comprising at least two single-piece parts 8 is manufactured, as illustrated in FIG. 12b. The method comprises a first provision step T1 of at least two single-piece parts 8 each made from the third mixture and separated from one another by at least one housing 26, as illustrated in FIG. 12b. As a variant, provision step T1 comprises an initial step, illustrated in FIG. 10a, in which at least one recess box 24 is placed in a mould 23, as illustrated in FIG. 15a, and the third mixture is then poured into the mould 23. Removal of recess boxes 24 is then performed to form the housings 26.

After provision step T1, one or more mechanical strengtheners 21 are placed in each housing 26 in a second step T2 illustrated in FIG. 12c. Preferentially, the mechanical strengtheners 21 rest on supports 27 to centre armatures 13 inside housings 16. Then, in a third step S2 illustrated in FIG. 12d, a curable product comprising a binder is poured into each housing 26 to coat each armature 13 and fix the latter to two neighbouring single-piece parts 8. What is meant by two neighbouring single-piece parts 8 is two single-piece parts 8 separated by a housing 26. Then, in a fourth step illustrated in FIG. 12e, the mould 23 is removed to obtain the panel. The supports 27 can be removed or left inside the housings 26.

Advantageously, the single-piece parts 8 are secured to one another by metal plates screwed into the wood-concrete or by screws before the curable product is poured S2. The metal plates limit the forces generated by the curable product on the single-piece parts 8.

The panel obtained comprises large contact surfaces between single-piece part 8 and the reinforcement part 20. The single-piece part made from the third mixture presents numerous microcavities, i.e. blind holes, created by the wood elements. The concrete in fact coats the wood elements creating the microcavities at the surface of single-piece part 8. In this way, when the curable product is poured into a housing provided in the single-piece part, the product will fill the numerous microcavities to increase the bonding surface between the reinforcement part 20 and single-piece part 8. The bonding surface is increased all the more with a through hole opening out at the level of two ends of single-piece part 8. A strong bond between the curable product and the wood-concrete is thereby obtained procuring a strong adherence of the reinforcement part 20 to single-piece part 8.

A panel is thus provided enabling a wall complying with antiseismic design standards to be constructed more quickly as it incorporates reinforcement parts having an enhanced flexural resistance. Furthermore, such a panel is simple to manufacture. Advantageously, the panel is stronger and lighter than a panel made from rough concrete.

The invention claimed is:

1. Building block for construction of a building comprising:
    a floor;
    a plurality of walls, at least one wall of the plurality of walls comprising a recess box, the walls of the plurality of walls being fixed to the floor and fixed to one another;
    wherein the floor comprises a support and a metal armature, the support being made from a first mixture comprising a mineral binder and vegetal material particles, the vegetal material particles being sunk in the mineral binder, a volume fraction of vegetal material particles in the first mixture being more than 50%, the support defining a plurality of first grooves and of second grooves, the first grooves extending from one end of the support to another end and wherein the first grooves present a first longitudinal direction secant to a second longitudinal direction of the second grooves;
    wherein the metal armature comprises a plurality of first metal rods arranged in the first grooves and second metal rods arranged in the second grooves;
    wherein the walls define a vertical groove extending over a height of the walls on external surface of the walls;
    wherein the floor comprises a second mixture filling the first grooves and the second grooves and completely covering the metal armature and the support to form reinforced beams, the second mixture having a volume fraction of vegetal material particles of less than 20%;
    wherein the first metal rods are arranged in the first grooves and the second metal rods are arranged in the second grooves;
    wherein the metal armature has connectors arranged salient from the support at the two ends of the first grooves in the first longitudinal direction for hoisting the building block;
    wherein the walls of the plurality of walls are made from a third mixture that comprises a mineral binder and vegetal material particles, the particles being sunk in the mineral binder, the volume fraction of vegetal material particles in the third mixture being more than 50%;
    and wherein the vertical groove opens onto the connectors salient from the support and onto the reinforced beams.

2. Building block according to claim 1 wherein the first metal rods define at least one ring and/or a hook salient from the support for forming the connectors.

3. Building block according to claim 2 wherein the first metal rods have an ascending connecting portion salient from the support, the ascending connecting portion being angled to be installed in the vertical groove of the external surface of one of the walls.

4. Building block according to claim 1 wherein the first metal rods comprise a descending connecting portion arranged salient from the support, the descending connecting portion being angled to be salient from the floor in continuation of a longitudinal direction of the vertical groove of one of the walls.

5. Building block according to claim 1 wherein the walls are fixed to the floor by means of a plurality of screws.

6. Building block according to claim 1 wherein a wall of the plurality of walls is formed by two single-piece parts made from the third mixture and separated from one another by a housing, the housing being filled with hardened concrete and at least one metal rod being at least partially sunk in the hardened concrete, the hardened concrete having a lower volume content of vegetal material particles than a vegetal material particles content of the third mixture or zero.

7. Building comprising first and second building blocks according to claim 1 wherein the first building block is erected adjacent to the second building block so that the vertical groove of the first building block is located facing the vertical groove of the second building block to form a first mould receiving a concrete pylon.

8. Building comprising first, second, third, and fourth building blocks according to claim 1 wherein the first building block is erected adjacent to the second building block so that the vertical groove of the first building block is located facing the vertical groove of the second building block to form a first mould receiving a concrete pylon, and wherein the third building block is erected adjacent to the fourth building block so that the vertical groove of the third building block is located facing the vertical groove of the fourth building block to form a second mould receiving a concrete pylon, the third building block being erected on the first building block, the fourth building block being erected on the second building block, the second mould extending the first mould.

9. Method for constructing a building comprising the following steps:
    providing first and second building blocks according to claim 1;
    arranging the first building block adjacently to the second building block so that the vertical groove of the first building block is facing the vertical groove of the second building block to form a first mould;
    casting concrete in the first mould to form a concrete pylon.

* * * * *